US008027852B2

(12) United States Patent
Fievoli et al.

(10) Patent No.: US 8,027,852 B2
(45) Date of Patent: Sep. 27, 2011

(54) APPARATUS, SYSTEMS AND METHODS FOR PROVIDING INVESTMENT PERFORMANCE ENHANCED LIFE INSURANCE PRODUCTS

(75) Inventors: Christopher Joseph Fievoli, St. Clemens (CA); Mark David Edwards, Waterloo (CA); Michelle Maria Enrica Lennox, Waterloo (CA); Stephen Ted Krupicz, Kitchener (CA)

(73) Assignee: The Manufacturers Life Insurance Company, Toronto, Ontario, CA (US)

( * ) Notice: Subject to any disclaimer, the term of this patent is extended or adjusted under 35 U.S.C. 154(b) by 651 days.

(21) Appl. No.: 12/184,391

(22) Filed: Aug. 1, 2008

(65) Prior Publication Data
US 2010/0030583 A1 Feb. 4, 2010

(51) Int. Cl.
*G06Q 40/00* (2006.01)
(52) U.S. Cl. .............................. 705/4; 705/35; 705/36 R
(58) Field of Classification Search ................ 705/4, 35, 705/36 R
See application file for complete search history.

(56) References Cited

U.S. PATENT DOCUMENTS

| 2002/0128877 A1* | 9/2002 | Levit ................................. 705/4 |
| 2004/0177021 A1* | 9/2004 | Carlson et al. .................. 705/36 |
| 2008/0040166 A1* | 2/2008 | Foti et al. .......................... 705/4 |

* cited by examiner

*Primary Examiner* — Elda Milef

(57) ABSTRACT

A system for providing an insurance product for at least one insured customer, including a communication device for receiving at least one application, each application associated with an applicant and including information about the applicant, a processor configured to determine for each application if the applicant qualifies as an insured customer, and a memory configured for storing an account record associated with each insured customer having at least one insured event associated with that insured customer, a benefit amount payable in association with the at least one insured event, an insurance cost, and a cash value based on predetermined account record factors, wherein the processor may define a reserve fund, determine an investment performance associated with the reserve fund during at least one period of time, and calculate a performance credit amount based on the investment performance of the reserve fund and the cash value.

29 Claims, 6 Drawing Sheets

50

52 — Name
54 — Age
56 — Gender ○ M ○ F
58 — Medical History
60 — Financial Information
62 — Select Benefit Amount
64 — Insurance Cost $

FIG. 2

APPARATUS, SYSTEMS AND METHODS FOR PROVIDING INVESTMENT PERFORMANCE ENHANCED LIFE INSURANCE PRODUCTS

FIELD

The embodiments described herein relate to apparatus, systems and methods for providing insurance products, and more particularly to apparatus, systems and methods for providing investment performance enhanced life insurance products.

BACKGROUND

Generally speaking, whole life insurance policies are life insurance policies that remain in force for the insured customer's whole life, provided that the owner of the policy pays the required premiums.

Some types of whole life policies are referred to as "participating" whole life policies. Generally, in a participating whole life policy, the insurance company shares a portion of profits for a particular block of policies with the owner of each policy in that block. Thus, each policyholder "participates" in the performance of their block.

Some participating whole life insurance policies contain guaranteed values that are based on long-term assumptions for factors for each block of policies. For example, factors such as expected investment returns, mortality rates, operating expenses, lapse rates, and tax rates may be used to estimate guaranteed values. If the actual performance for the block of policies is more favorable than the guaranteed values, an operating income is generated (e.g. a "surplus"). Each year, the insurance provider may distribute a portion of the surplus as a "dividend" paid to the policyholders. The remainder of the surplus may be held in the reserve fund to maintain the strength and stability of that block of policies into the future.

In addition, policyholders of participating whole life insurance policies have rights akin to ownership in the insurance company. For example, participating policyholders may have certain voting rights, such as a right to choose a predetermined number of board members.

SUMMARY

According to some embodiments, there is provided a system for providing an insurance product for at least one insured customer, comprising a communication device for receiving at least one application, each application associated with an applicant and including personal, medical and financial information about the applicant, a processor coupled to the communication device and configured to determine for each application if the applicant qualifies as an insured customer based on the personal, medical and financial information, and a memory accessible to the processor and configured for storing an account record associated with each insured customer, each account record having at least one insured event associated with that insured customer, a benefit amount payable in association with the at least one insured event, an insurance cost to be received from that insured customer, and a cash value based on predetermined account record factors, wherein the memory stores program code executable by the processor for defining a reserve fund based on a sum of the benefit amounts for each of the insured customers, determining an investment performance associated with the reserve fund during at least one period of time, and calculating a performance credit amount for each insured customer based on the investment performance of the reserve fund and the cash value in the account record for that insured customer.

In some embodiments, each account record further includes an accumulation account, and the program code is executable by the processor for allocating funds into the accumulation account for at least one of the insured customers based on the performance credit amount.

In some embodiments, each account record further includes an accumulation account, and wherein the method further comprises allocating funds into the accumulation account for at least one of the insured customers based on a deposit made directly by the at least one of the insured customers. In some embodiments, the accumulation account has a balance that earns a rate of return based on a smoothed rate of return for the reserve fund.

In some embodiments, the program code is executable by the processor for associating an additional amount of paid up insurance coverage with at least one insured customer based on the performance credit amount.

In some embodiments, the investment performance associated with the reserve fund is smoothed by amortizing realized and unrealized gains and losses over the at least one period of time and a subsequent period of time.

In some embodiments, the performance credit is based on a smoothed rate of return of the reserve fund for a particular period of time and includes a first amortized portion from the particular period and a second unamortized portion from a preceding period of time.

In some embodiments, the insured event is the death of the insured customer and the benefit amount is a death benefit payable to at least one beneficiary upon the death of the insured customer.

In some embodiments, the program code is executable by the processor to pay the funds in the accumulation account to at least one beneficiary upon the death of the insured customer.

In some embodiments, the determining if each applicant is insurable includes underwriting at least one of the personal, medical and financial information for that applicant.

In some embodiments, the insurance cost includes a number of payments to be made by the insured customer during particular periods of time.

In some embodiments, the program code is executable by the processor for causing the policy to lapse in the event that at least one of the number of payments is not received for at least one of the particular periods of time.

In some embodiments, the program code is executable by the processor for defining an additional payment amount to be received for at least one of the insured customers to provide additional life insurance for the at least one of the insured customers.

In some embodiments, the performance credit amount for each insured customer is calculated on an annual basis.

According to other embodiments, there is provided a method of providing an insurance product, comprising receiving at least one application, each application associated with an applicant and including personal, medical and financial information about the applicant, determining for each application if the applicant qualifies as an insured customer based on the personal, medical and financial information, defining an account record associated with each insured customer, each account record having at least one insured event associated with that insured customer, a benefit amount payable in association with the at least one insured event, an insurance cost, and a cash value based on predetermined account record factors, defining a reserve fund based on a sum of the benefit amounts for each of the insured customers, determining an investment performance associated with the reserve fund during at least one period of time, and calculating a performance credit amount for each insured customer based on the investment performance of the reserve fund and the cash value in the account record for that insured customer.

In some embodiments, each account record further includes an accumulation account, and wherein the method further comprises allocating funds into the accumulation account for at least one of the insured customers based on the performance credit amount.

In some embodiments, each account record further includes an accumulation account, and wherein the method further comprises allocating funds into the accumulation account for at least one of the insured customers based on a deposit made directly by the at least one of the insured customers.

In some embodiments, the accumulation account has a balance that earns a rate of return based on a smoothed rate of return for the reserve fund.

In some embodiments, the method further comprises associating an additional amount of paid up insurance coverage with at least one insured customer based on the performance credit amount.

In some embodiments, the investment performance associated with the reserve fund is smoothed by amortizing realized and unrealized gains and losses over the at least one period of time and a subsequent period of time.

In some embodiments, the performance credit amount for a particular period of time includes a first amortized portion from the particular period and a second unamortized portion from a preceding period of time.

In some embodiments, the insured event is the death of the insured customer and the benefit amount is a death benefit payable to at least one beneficiary upon the death of the insured customer.

In some embodiments, the funds in the accumulation account are payable to at least one beneficiary upon the death of the insured customer.

In some embodiments, the determining if each applicant is insurable includes underwriting at least one of the personal, medical and financial information for that applicant.

In some embodiments, the insurance cost includes a number of payments to be made by the insured customer during particular periods of time.

In some embodiments, the method further comprises causing the policy to lapse in the event that at least one of the number of payments is not received for at least one of the particular periods of time.

In some embodiments, the method further comprises defining an additional payment amount to be received for at least one of the insured customers to provide additional life insurance for the at least one of the insured customers.

In some embodiments, the performance credit amount for each insured customer is calculated on an annual basis.

According to some embodiments, there is provided a physical computer readable medium including computer executable instructions which, when executed on a computing device, cause the computing device to receive at least one application, each application associated with an applicant and including personal, medical and financial information about the applicant, for each application, determine if the applicant qualifies as an insured customer based on the personal, medical and financial information, define an account record associated with each insured customer, each account record having at least one insured event associated with that insured customer, a benefit amount payable in association with the at least one insured event, an insurance cost to be received from that insured customer, and a cash value based on predetermined account record factors, define a reserve fund based on a sum of the benefit amounts for each of the insured customers, determine an investment performance associated with the reserve fund during at least one period of time, and calculate a performance credit amount for each insured customer based on the investment performance of the reserve fund and the cash value in the account record for that insured customer.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 2 a diagram of an application form presented to a user applying for an investment performance enhanced life insurance product;

DETAILED DESCRIPTION

Figure 1:
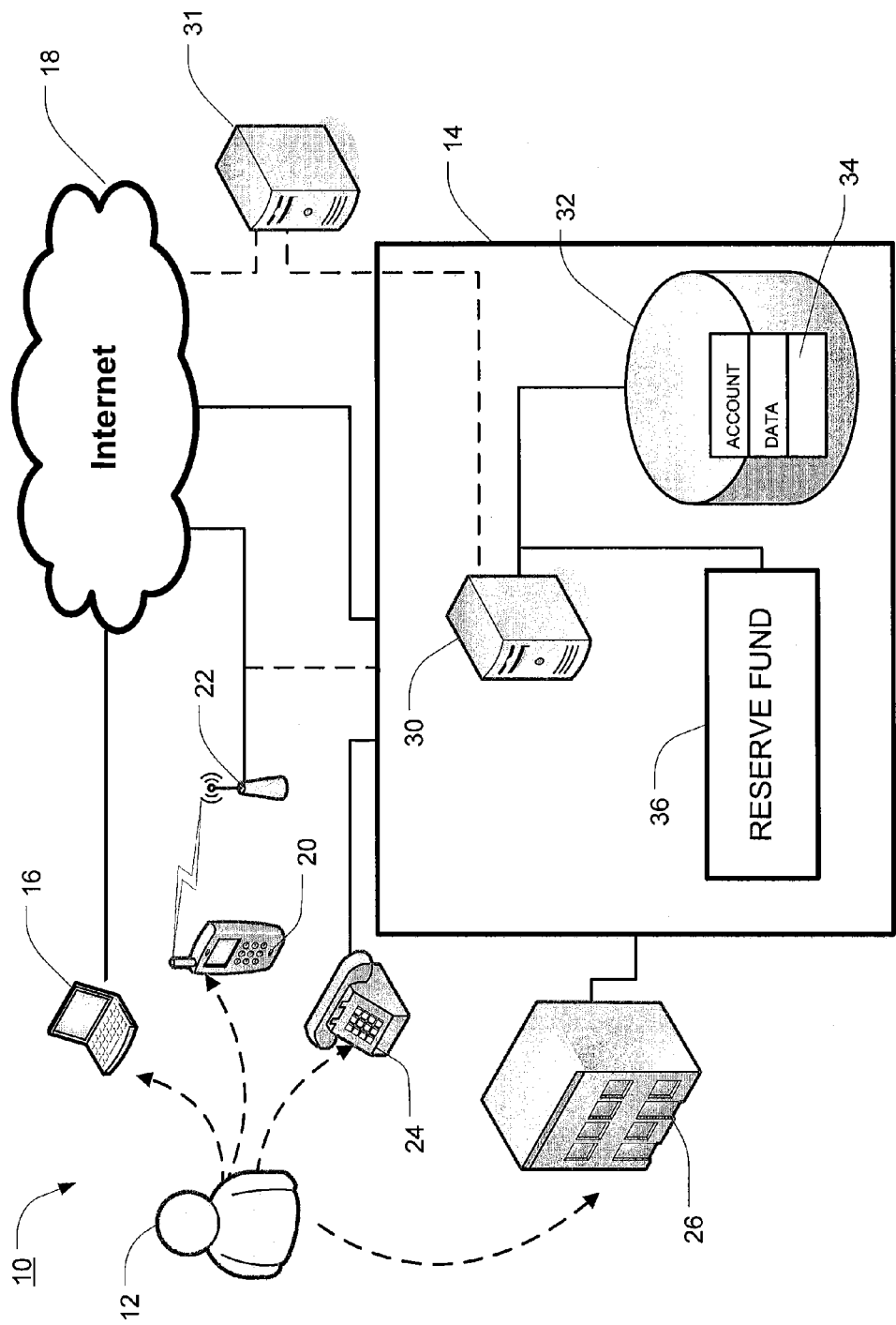
FIG. 1 is a block diagram illustrating a system for providing investment performance enhanced life insurance products according to one embodiment.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of various embodiments described herein.

The embodiments of the systems and methods described herein may be implemented in hardware or software, or a combination of both. For example, these embodiments may be implemented in computer systems and computer programs, which may be stored on a physical computer readable medium, executable on programmable computers each comprising at least one processor, a data storage system (including volatile and non-volatile memory and/or storage elements), at least one input device, and at least one output device. For example and without limitation, the programmable computers may be a personal computer, a laptop, a personal data assistant (PDA), or a smart phone.

In some embodiments, program code can be applied to input data to perform the functions described herein and to generate output information. The output information can then be supplied to one or more output devices for outputting to one or more users.

According to some embodiments, described herein are apparatus, systems and methods for providing non-participating, investment performance enhanced life insurance products. In some embodiments, the investment performance enhanced life insurance products are whole life insurance products.

Unlike known participating whole life policies, owners of the insurance products described herein have no preferred voting rights associated with the company providing the insurance products (i.e. the insurance provider). Furthermore, the policy owners have no right to dividends based on the performance of a particular block of policies. Instead, the owners or policyholders of the insurance products described herein may benefit from performance credits that are calculated based on the performance of a particular investment fund during one or more periods of time.

In some embodiments, some or all of the performance credits may be used to purchase paid-up-insurance (PUI) coverage for the policyholder. PUIs are additional layers of life insurance coverage associated with the whole life insurance policy. Generally, no further premiums are due to maintain the PUIs.

In some embodiments, some or all of the performance credits can be reinvested in an accumulation account. Under regulatory schemes, the accumulation account may be used to accumulate some funds within the insurance product on a tax-deferred basis.

In some embodiments, the funds in the accumulation account may be payable to one or more beneficiaries upon a predetermined event occurring, such as the death of the policyholder. In some embodiments, the funds in the accumulation account may also be withdrawn at the request of the policyholder.

According to some alternative embodiments, performance credits can be paid to the owner of the insurance product as cash payments.

In some embodiments, the funds held by the insurance provider in the reserve fund are managed by the insurance provider, or a professional manager as assigned by the insurance provider, with minimal to no transparency to the policyholder.

In some embodiments, the performance credits are smoothed. Smoothing tends to decrease the volatility of the fund performance from year to year by amortizing the realized and unrealized gains and/or losses of the investment fund over a number of different time periods (e.g. a gain or a loss in a particular year will be realized over several years).

In some embodiments, the insurance product may be provided as a limited pay product, with larger insurance costs paid for a fixed number of years. In other embodiments, insurance costs are payable for the entire life of the policy holder.

Turning now to FIG. 1, a system 10 for providing investment performance enhanced life insurance products according to one embodiment is shown. Using the system 10, an applicant (e.g. a user 12) seeking an investment performance enhanced life insurance product is able to communicate with an insurance provider 14 to apply for and to purchase investment performance enhanced insurance products. The application process typically requires that the applicant submit personal information (e.g. name, address, age, marital status, occupation, etc.), financial information (e.g. annual income, net worth, outstanding liabilities, information about other existing insurance products, etc.) and medical information (e.g. medical histories, pre-existing medical conditions, test results, etc.) about the applicant. Based on the personal, financial, and medical information, the insurance provider 12 may make a determination as to whether the applicant is approved for an insurance product, for example by performing underwriting. Once the applicant has been approved by the insurance provider 14, the user 12 is considered to be an insured customer.

The user 12 is also generally able to use the system 10 to make payments related to insurance costs associated with a particular insurance product and to manage performance credits that may be credited to the user 12, such as by depositing funds into an accumulation account and purchasing paid up insurance (PUI), as will be described in further details below.

The communication between the user 12 and the insurance provider 14 can occur either directly or indirectly via any number of suitable communication techniques. In one embodiment, the user 12 could use a computer 16 having an input device and an output device (e.g. a laptop with a keyboard and a display screen) to connect to the insurance provider 14 via a communications channel (e.g. by browsing to a webpage provided by the insurance provider 14 on the Internet 18).

For example, the user 12 could access an application form 50 that is provided as a webpage, as shown in FIG. 2. The application form 50 may be a questionnaire to be completed by the user 12, and may include inquiries about personal information (e.g. name 52, age 54, gender 56), medical information (e.g. medical history 58), and financial information 60 (e.g. financial history, current income information, etc.) about the applicant.

In some embodiments, the medical history 58 inquiry can include highly specific questions about the user 12, such as "Have you ever had a heart attack?" or "Does anyone in your family have a history of diabetes?"

In some embodiments, the application form 50 could be a web form, and the data entered by the user 12 could be stored on a web server before being provided to the system 10. The application form 50 could also be provided on a terminal located within a particular location, such as at the physical office 26 of a broker affiliated with the system 10. In alternative embodiments, the application form 50 can be provided in a paper format to be sent to the user 12 (e.g. by mail).

As shown, the application form 50 may provide the user 12 with the option of requesting a desired benefit amount 62, such as $100,000 or $200,000.

In some embodiments, such as where the application form 50 is a web form, the application form 50 may also provide the user 12 with real-time or substantially real-time feedback about a calculated insurance cost 64 based on the data that the user 12 has provided. For example, the application form 50 may display an insurance cost 64 that is an estimate of the insurance costs that would be due if the applicant is approved. In this manner, the application form 50 can illustrate or simulate the expected costs so that the applicant can appreciate what they are purchasing.

In some alternative embodiments, the application form 50 may also include a number of other elements, such as a method of selecting payment options (e.g. credit card, direct withdrawal or other billing methods).

In some embodiments, the user 12 could communicate with the insurance provider 14 using a wireless device 20, such as a smart phone or PDA connected to a wireless communications network through a wireless access point 22. The wireless access point 22 may interface directly with the insurance provider 14 or an agent of the insurance provider 14. In other embodiments, the wireless access point 22 may connect to the insurance provider 14 through a data connection established over the Internet 18 or via another data communications network. This could involve the user 12 using the wireless device 20 to browse to a webpage configured for display on a smart phone.

The user 12 could also communicate with the insurance provider 14 via the system 10 using a telephone 24, such as a conventional telephone, a voice-over-IP device or other telephony device. For example, the user 12 could communicate with the insurance provider 14 by calling the insurance provider 14 using a 1-800 number or another direct dial number.

The user 12 could also indirectly communicate with the insurance provider 14 via the system 10 by communicating with an agent of the insurance provider 14. For example, the user 12 could contact a sales representative, financial advisor or broker, or arrange a meeting with the agent or broker at a physical office 26. Alternatively, the user 12 may also use other suitable methods of communicating with the insurance provider 14, such as facsimile and conventional mail.

The system 10 also includes a number of other functional components, including a processor 30 or server configured for processing applications from applicants (e.g. the user 12) and for calculating and managing performance credits described in greater detail below. The processor 30 is generally in communication with one or more databases 32, each typically having a plurality of data records 34, such as account records containing data about one or more insured customers and/or applicants.

In some embodiments the system 10 may include a plurality of processors 30 and a plurality of databases 32.

In some embodiments, the data records 34 may contain information about one or more individual users 12, such as personal information, medical information, and financial information. For example, the data records 34 may include details about an insured event associated with particular customers (e.g. the death of a particular insured customer), the benefit amount payable in association with the at least one insured event (e.g. a death benefit payable upon the death of the particular insured customer), an insurance cost to be received in association with a particular policy (e.g. annual or other regular payments to be made to the insurance provider 14 to prevent the insurance product from lapsing), and a cash value based on predetermined account record factors, such as for example the amount of benefit, age of the insured customer, sex of the insured customer, cost duration, and so on.

In some embodiments, the cash value associated with the insurance product is an amount against which the policyholder may borrow funds, or an amount that the policyholder may withdraw by canceling the insurance product.

In some embodiments, the data records 34 may contain other product information, such as information about different particular features or options that are available as part of the insurance products being offered to the users 12.

In some embodiments, the system 10 can use the various data records 34 stored within the databases 32 to more accurately calculate insurance costs to be paid by one or more particular users 12, or to approve individual users 12 on the basis of a risk assessment (such as by comparing the level of risk presented by a particular customer to a predetermined acceptable level of risk based on underwriting performed on one or more of personal, financial and medical information about each user 12).

In some embodiments, the system 10 may also have one or more backup servers 31, which may duplicate some or all of the data records 34 stored on the server 30. The backup servers 31 may be desirable to prevent data loss in the event of an accident such as a fire, flooding, or theft. The system 10 may allow the insurance provider 14 and/or an agent of the insurance provider 14 (e.g. a broker) to access the server 30 and the backup server 31 in order to store and update data records 34 in the databases 32 as desired.

In some embodiments, the backup server 31 may be directly connected to the insurance provider 14 but located within the system 10 at a different physical location from the server 30. For example, the backup server 31 could be located at a remote storage location at a distance from the insurance provider 14, and the insurance provider 14 could connect to the backup server 31 using a secure communications protocol (e.g. over the Internet 18) to ensure that the confidentiality of the data records 34 is maintained.

The system 10 also includes an associated reserve fund 36. The reserve fund 36 is a pool of funds set up to offset the potential liabilities of the insurance products offered to the insured customers. For example, when an insured event occurs for a particular insured customer, the benefit amount is typically paid to one or more beneficiaries from the reserve funds 36.

In some jurisdictions, the value of the reserve fund 36 may be regulated based on the total potential exposure to liability for the insurance provider 14. For example, the reserve fund 36 may be a percentage of the sum of all benefit amounts for all insured customers.

Preferably, all or a portion of the reserve fund 36 is invested so that the value of the reserve fund 36 will tend to increase over time. For example, various proportions of the reserve fund 36 may be invested into different investment vehicles, such as bonds, real estate, mortgages and equities, to obtain an asset mix designed to provide desired rates of return for the reserve fund 36 and subject to acceptable levels of risks. Generally, the asset mix will be selected that the risks to the reserve fund 36 are low.

Figure 3:
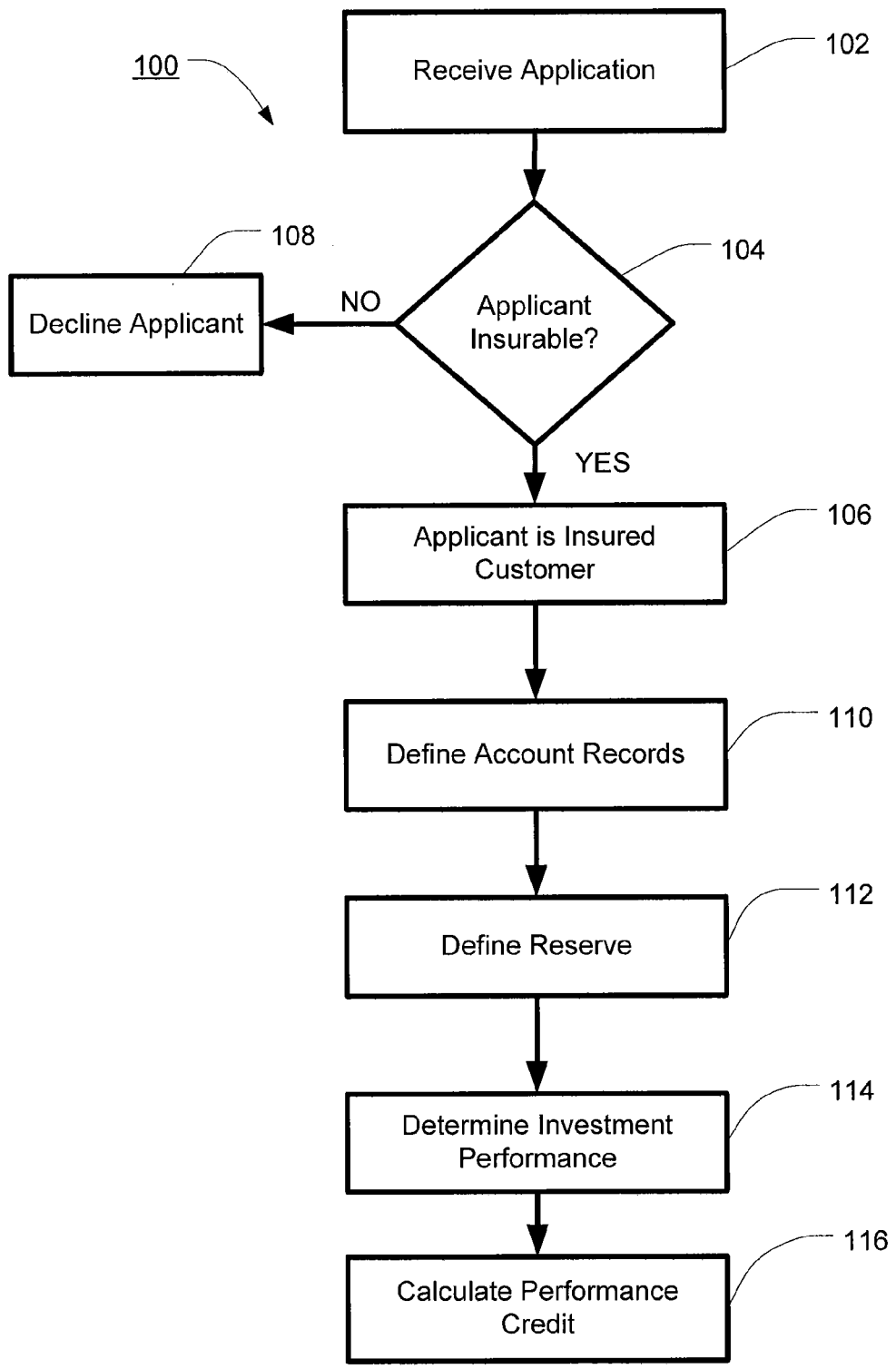
FIG. 3 is a flowchart illustrating a method of processing a request for investment performance enhanced life insurance products using the system of FIG. 1.

Turning now to FIG. 3, a method 100 of using the system 10 to provide investment performance enhanced insurance products is shown according to one embodiment.

At step (102), the system 10 receives at least one application for an investment performance enhanced life insurance product, such as a whole life insurance product. Each application is associated with one or more applicants (e.g. user 12), and may include personal, medical and financial information about each applicant.

At step (104), the system 10 determines if each applicant is insurable. According to some embodiments, this may be done based on the personal, medical and financial information provided in the application for each applicant. For example, underwriting may be performed on one or more of the personal, medical and financial information to determine whether the applicant presents an acceptable risk to the insurance provider 14.

If, at step (104), the system 10 determines that the applicant is insurable, then the method 100 proceeds to step (106) and the applicant is considered to be an insured customer. Otherwise, the method 100 proceeds to step (108) and the applicant is denied insurance coverage. In some embodiments, the applicant may be sent a message (e.g. sent to the computer 16) informing him or her of the decision made at step (104).

At step (110), the system 10 defines an account record associated with each insured customer. Each account record may include at least one insured event associated with that insured customer. In a preferred example, the insured event is the death of the insured customer.

Each account record may also include a benefit amount payable in association with the at least one insured event. For example, a death benefit may be defined that is payable to one or more beneficiaries upon the death of the insured customer. The benefit amount is selected by each applicant, subject to possible limitations set by the insurance provider based on factors such as personal, financial and medical information.

Each account record may also include an insurance cost to be received from that insured customer in association with the insurance policy. Generally speaking, the insurance cost represents an amount that must be paid to the insurance provider 14 in exchange for maintaining the insurance product. In some embodiments, the insurance cost may include a number of payments to be made to the insurance provider 14 during predetermined periods of time (for example, annual payments made by the policyholder to the insurance provider 14).

In some embodiments, the insurance product may lapse in the event that one or more of the payments are not received for one or more particular periods of time. In some embodiments, according to regulatory requirements, the insurance provider 14 may provide the insured customer with the option to reinstate the insurance product after a missed payment, such as by paying a further fee and providing evidence of insurability.

Each account record may also include a cash value. The cash value is generally based on predetermined account record factors (such as the amount of benefit, age of the insured customer, sex of the insured customer, and so on).

At step (112), the system 10 defines the reserve fund 36. According to some embodiments, the reserve fund 36 may be based on the sum of the benefit amounts for each of the insured customers. In some areas, the reserve fund 36 may be defined according to regulatory requirements associated with the provision of insurance, and is designed to offset the potential liabilities of the insurance provider 14 for the insurance products being offered.

At step (114), the system 10 determines an investment performance associated with the reserve fund 36 during at least one period of time. For example, the reserve fund 36 may be invested into a mix of assets including bonds, real estate, mortgages and equities.

The investment performance of the reserve fund 36 may be calculated over various different periods of time. In some preferred embodiments, the investment performance of the reserve fund 36 is calculated annually or several times a year (e.g. quarterly). The investment performance represents the net gain or loss of the investments of the reserve fund 36 for one or more periods of time.

At step (116), the system 10 calculates a performance credit amount for each insured customer based on the investment performance of the reserve fund 36. The performance credit amount is generally based on the investment performance of the reserve fund 36 and the cash value in the account record for each insured customer.

According to some embodiments, the performance credit amount for each insured customer may be calculated at various predetermined times. Preferably, the performance credit amount is calculated for the same time period as the investment performance of the reserve fund 36. For example, the investment performance and performance credit amount may be calculated on an annual basis, such as on the anniversary of the purchase date of the policy for each insured customer.

Figure 4:
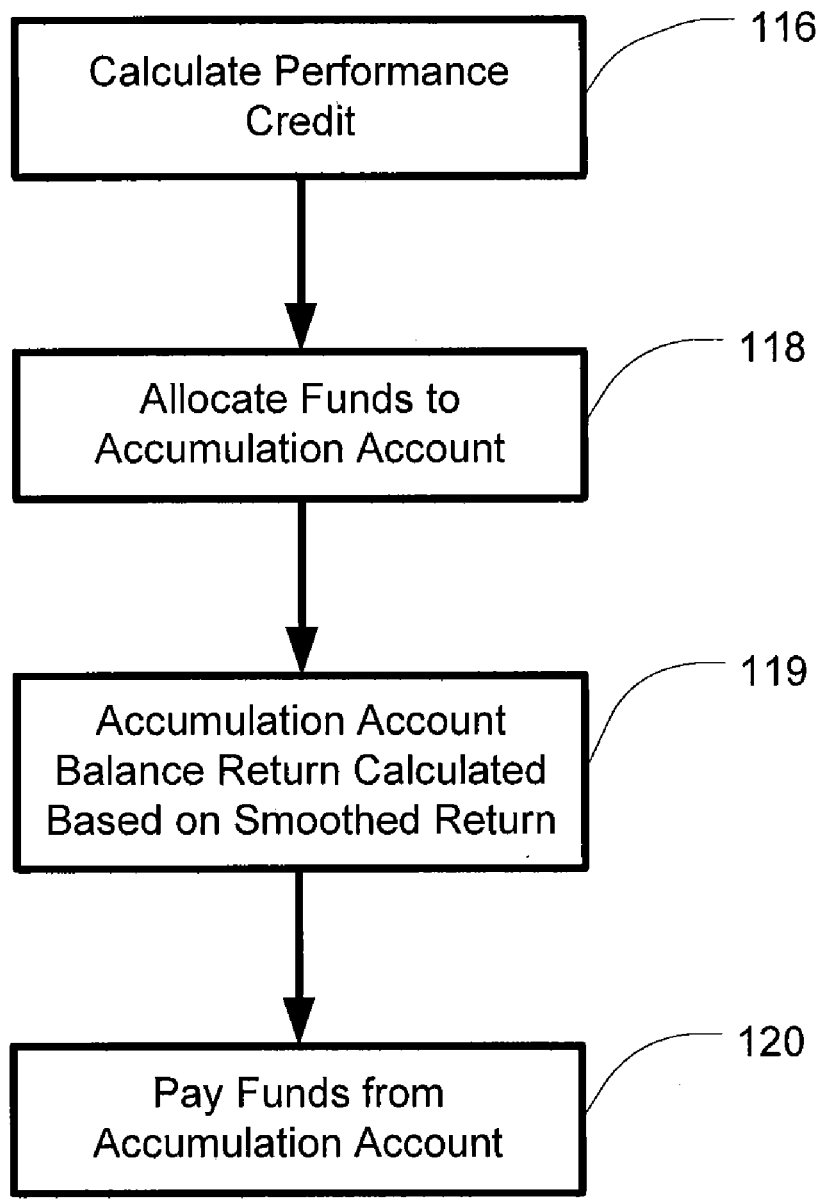
FIG. 4 is a flowchart illustrating a method of allocating funds in an accumulation account based on a performance credit amount.

As shown in FIG. 4, in some embodiments, the method 100 continues from step (116) to step (118). In such embodiments, the account record includes an accumulation account, and at step (118), the system 10 allocates funds into the accumulation account for at least one of the insured customers based on their performance credit amounts. For example, a customer who had a performance credit of $5000 calculated at step (116) may have all of that $5000 deposited into the accumulation account. In some jurisdictions, the accumulation account allows funds deposited therein to grow in a tax-sheltered manner (possibly up to some regulatory limit). In some embodiments, the rate of return for the accumulation account may be based on a smoothed rate of return for the reserve fund as will be explained in further detail below.

In some embodiments, at step (119) the accumulation account has a balance that earns a rate of return based on the smoothed rate of return of the reserve fund.

At step (120), the funds in the accumulation account are paid out. For example, the funds may be paid out upon the death of the insured customer. In other embodiments, some or all of the funds may be withdrawn from the accumulation account at a predetermined event (such as the insured customer reaching a particular age), or upon the request of the insured customer. In some regulatory schemes, all or a portion of the funds may be taxable.

Figure 5:
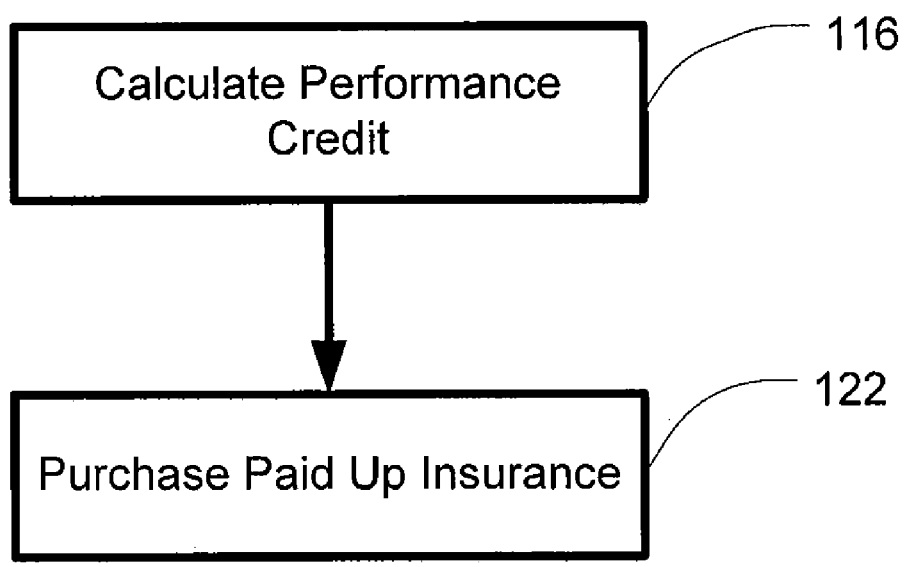
FIG. 5 is a flowchart illustrating a method of purchasing paid up insurance using a performance credit amount.

Turning now to FIG. 5, in some embodiments the method 100 proceeds from step (116) to step (122).

At step (122), the performance credits are used to purchase paid up insurance (PUI) for at least one insured customer. The value of the paid up insurance products may be based on the performance credit amount for the at least one insured customer. For example, the insured customer who has $5000 in performance credits may use the $5000 to purchase paid up insurance coverage. Generally, however, the amount of PUI is less than the amount of the performance credit (e.g. a $5000 performance credit may be used to purchase $800 worth of PUI).

In some alternative embodiments, the system 10 calculates a cash payment to be made to at least one of the insured customers based on their respective performance credit amounts. For example, a particular customer may have had a performance credit of $5000. In some embodiments, all or a portion of that $5000 may be paid to that customer as cash. The payment may be made in cash or some other manner, such as by cheque, by electronic transfer of funds, or otherwise. In some regulatory schemes, all or a portion of the payment may be taxable.

In some embodiments, the performance credits may be deposited into the accumulation account by default. The insured customer may be notified of the amount of the performance credit, and may be given the option to purchase paid up insurance instead of the funds being deposited in the accumulation account.

According to some embodiments, the investment performance associated with the reserve fund 36 may be smoothed over several periods of time to help reduce volatility of the investment performance. For example, investment performance may be smoothed by amortizing realized and unrealized gains and losses for the current investment period over subsequent investment periods.

Suppose for example in January of 2008, the reserve fund 36 purchases $100,000 worth of equities that pay an annual dividend of $5,000. At the end of 2008, the value of the equities increases to $115,000 (due to fluctuations in the market value of the equities as is well known). Furthermore, at the end of 2009, the value of the equities rises to $120,000. However, at the end of 2010, the value of the equities drops to $117,500.

Under a non-smoothed model, the investment performance of the reserve fund 36 will tend to be highly variable from year to year. For example, as shown in Table 1 below, for this example, in 2008 the rate of return on the investment fund was 18.6%, in 2009 the rate of return was 8.5%, and in 2010 the rate of return dropped to 2.1% (where the rate of return is determined to be equal to the total income for a particular period of time divided by the average assets for that period of time). While the overall investment performance of the reserve fund 36 may provide a desired rate of return, the variability between year-to-year tends to make the investment performance appear less stable and is therefore less desirable.

TABLE 1

Annual Rates of Return Without Smoothing

| Year | Opening Assets | Closing Assets | Market Gains (Losses) | Dividends | Total Income | Return % |
|---|---|---|---|---|---|---|
| 2008 | $100,000 | $115,000 | $15,000 | $5,000 | $20,000 | 18.6% |
| 2009 | $115,000 | $120,000 | $5,000 | $5,000 | $10,000 | 8.5% |
| 2010 | $120,000 | $117,500 | ($2,500) | $5,000 | $2,500 | 2.1% |

In contrast, by smoothing the investment performance, changes in the market value of the equities are brought into income at a slower rate over an extended period of time. For example, the changes in the market value of equities may be recognized using straight-line amortization over three, five or ten years.

Consider for example the same scenario outlined above, but with smoothing, where:

Amortized Gains=market value of gains/losses that are realized as income for that period of time;

Unamortized Gains=market value gains/losses that have yet to be brought into income (i.e. gains/losses that are carried forward);

Total Adjusted Income=dividends plus amortized gains for that year; and

Adjusted assets=initial asset value plus amortized gains/losses to date.

As shown in Table 2 below, the rates of return from year to year become less volatile, with a return of 7.8% in 2008, 8.5% in 2009 and 7.8% in 2010.

TABLE 2

Annual Rates of Return With Smoothing

| Year | Opening Adjusted Assets | Market Gains (Losses) | Amortized Gains | Unamortized Gains | Closing Adjusted Assets | Dividends | Total Adjusted Income | Return % |
|---|---|---|---|---|---|---|---|---|
| 2008 | $100,000 | $15,000 | $3,000 | $12,000 | $103,000 | $5,000 | $8,000 | 7.8% |
| 2009 | $103,000 | $5,000 | $4,000 | $13,000 | $107,000 | $5,000 | $9,000 | 8.5% |
| 2010 | $107,000 | ($2,500) | $3,500 | $7,000 | $110,500 | $5,000 | $8,500 | 7.8% |

Unamortized gains are unrecognized for a period of time, and are not realized as income for the individual customers until subsequent investment periods.

Figure 6:
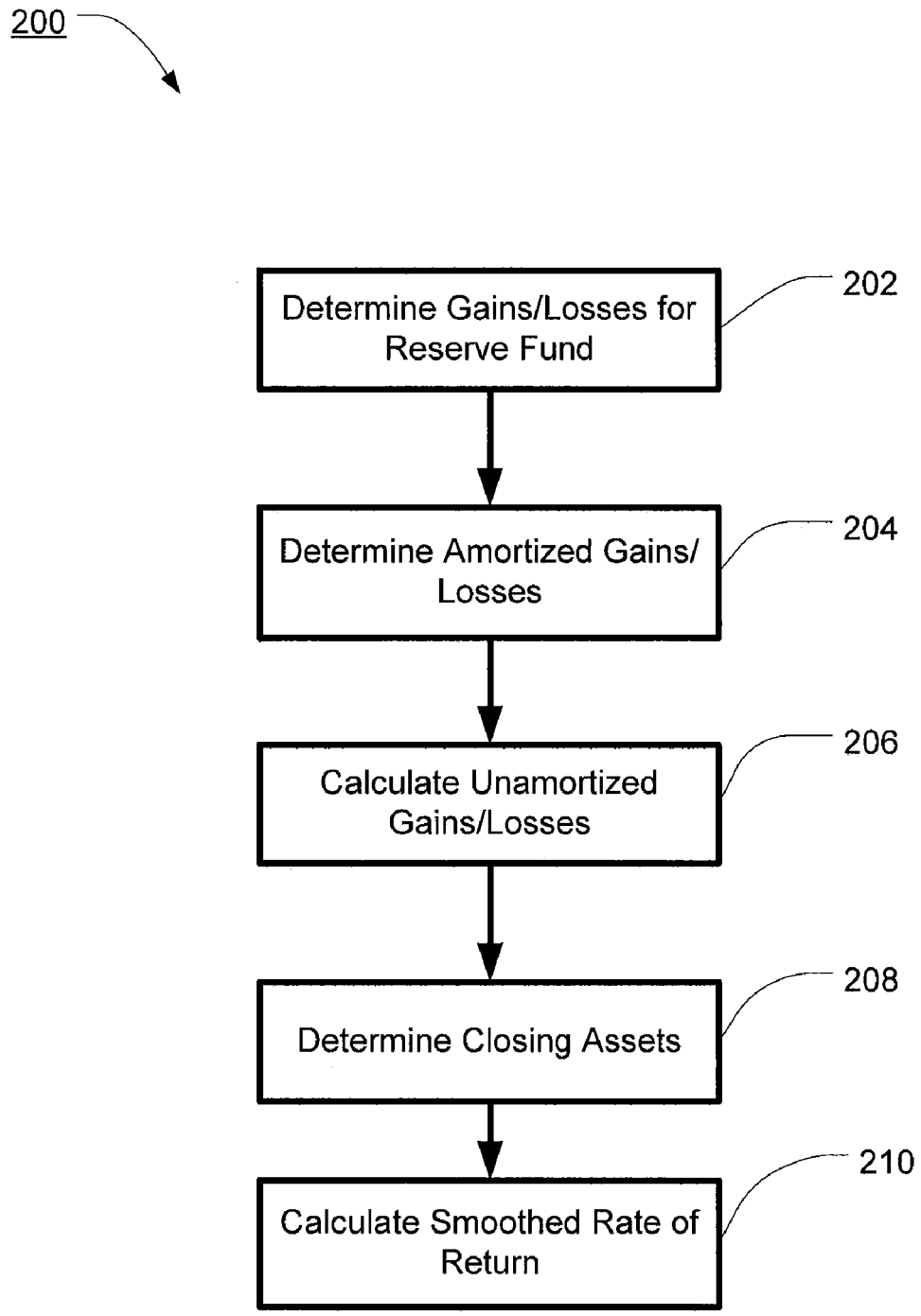
FIG. 6 is a flowchart illustrating a method of smoothing investment performance by amortizing gains according to another embodiment.

Turning now to FIG. 6, one example method 200 of smoothing investment performance using the system 10 is illustrated.

At step (202), the system 10 determines the market gains or market losses for the reserve fund 36 for a particular period of time (e.g. one investment year).

At step (204), the system 10 determines amortized gains or losses for that period of time. The amortized gains or losses include actual market gains or losses for that particular period, plus one or more market gains for losses from a previous period of time (if and where available).

At step (206), the system 10 calculates the unamortized gains (if any). These unamortized gains will be carried forward and applied to subsequent periods of time.

At step (208), the system 10 determines the closing assets for that particular period of time.

At step (210), the system 10 calculates the smoothed rate of return for the reserve fund for the at least one insured customer based on the amortized gains for that particular period of time. For example, the smoothed rate of return for the reserve fund calculated for a current investment year may include a first portion (e.g. the amortized gains) from the current year time and a second portion carried forward from a preceding or earlier period of time (e.g. a portion of the unamortized amounts from one or more previous investment years). This smoothed rate of return may then be used to determine the performance credit amount.

Generally speaking, smoothing may be used to provide a rate or return that is averaged over several periods of time. In this manner, the volatility in investment returns of the reserve fund from year to year may be reduced. As the rate of the investment returns highly influence the performance credit amounts this smoothing tends to make the performance credit amounts more stable.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of embodiments of the invention and non-limiting and it will be understood by persons skilled in the art that other variants and modifications may be made without departing from the scope of the claims appended hereto.

The invention claimed is:

1. A system for providing an insurance product for at least one insured customer, comprising:

a) a communication device for receiving at least one application, each application associated with an applicant and including personal, medical and financial information about the applicant;

b) a processor coupled to the communication device and configured to determine for each application if the applicant qualifies as an insured customer based on the personal, medical and financial information; and c) a memory accessible to the processor and configured for storing an account record associated with each insured customer, each account record having:

i. at least one insured event associated with that insured customer;

ii. a benefit amount payable in association with the at least one insured event;

iii. an insurance cost to be received from that insured customer; and iv. a cash value based on predetermined account record factors;

d) wherein the memory stores program code executable by the processor for:
  i. defining a reserve fund based on a sum of the benefit amounts for each of the insured customers;
  ii. determining an investment performance associated with the reserve fund during at least one period of time; and
  iii. calculating a performance credit amount for each insured customer based on the investment performance of the reserve fund and the cash value in the account record for that insured customer.

2. The system of claim 1, wherein each account record further includes an accumulation account, and the program code is executable by the processor for allocating funds into the accumulation account for at least one of the insured customers based on the performance credit amount.

3. The system of claim 1, wherein each account record further includes an accumulation account, and the program code is executable by the processor for allocating funds into the accumulation account for at least one of the insured customers based on a deposit made directly by the at least one of the insured customers.

4. The system of claim 2, wherein the accumulation account has a balance that earns a rate of return based on a smoothed rate of return for the reserve fund.

5. The system of claim 1, wherein the program code is executable by the processor for associating an additional amount of paid up insurance coverage with at least one insured customer based on the performance credit amount.

6. The system of claim 1, wherein the investment performance associated with the reserve fund is smoothed by amortizing realized and unrealized gains and losses over the at least one period of time and a subsequent period of time.

7. The system of claim 1, wherein the performance credit is based on a smoothed rate of return of the reserve fund for a particular period of time that includes a first amortized portion from the particular period and a second unamortized portion from a preceding period of time.

8. The system of claim 1, wherein the insured event is the death of the insured customer and the benefit amount is a death benefit payable to at least one beneficiary upon the death of the insured customer.

9. The system of claim 2, wherein the program code is executable by the processor to pay the funds in the accumulation account to at least one beneficiary upon the death of the insured customer.

10. The system of claim 1, wherein the determining if each applicant is insurable includes underwriting at least one of the personal, medical and financial information for that applicant.

11. The system of claim 1, wherein the insurance cost includes a number of payments to be made by the insured customer during particular periods of time.

12. The system of claim 11, wherein the program code is executable by the processor for causing the policy to lapse in the event that at least one of the number of payments is not received for at least one of the particular periods of time.

13. The system of claim 1, wherein the program code is executable by the processor for defining an additional payment amount to be received for at least one of the insured customers to provide additional life insurance for the at least one of the insured customers.

14. The system of claim 1, wherein the performance credit amount for each insured customer is calculated on an annual basis.

15. A method of providing an insurance product, comprising:

a) receiving at least one application, each application associated with an applicant and including personal, medical and financial information about the applicant;
  b) determining for each application if the applicant qualifies as an insured customer based on the personal, medical and financial information;
  c) defining an account record associated with each insured customer, each account record having:
    i. at least one insured event associated with that insured customer;
    ii. a benefit amount payable in association with the at least one insured event;
    iii. an insurance cost; and
    iv. a cash value based on predetermined account record factors;
  d) defining a reserve fund based on a sum of the benefit amounts for each of the insured customers;
  e) determining an investment performance associated with the reserve fund during at least one period of time; and
  f) calculating a performance credit amount for each insured customer based on the investment performance of the reserve fund and the cash value in the account record for that insured customer.

16. The method of claim 15, wherein each account record further includes an accumulation account, and wherein the method further comprises allocating funds into the accumulation account for at least one of the insured customers based on the performance credit amount.

17. The method of claim 15, wherein each account record further includes an accumulation account, and wherein the method further comprises allocating funds into the accumulation account for at least one of the insured customers based on a deposit made directly by the at least one of the insured customers.

18. The method of claim 16, wherein the accumulation account has a balance that earns a rate of return based on a smoothed rate of return for the reserve fund.

19. The method of claim 15, further comprising associating an additional amount of paid up insurance coverage with at least one insured customer based on the performance credit amount.

20. The method of claim 15, wherein the investment performance associated with the reserve fund is smoothed by amortizing realized and unrealized gains and losses over the at least one period of time and a subsequent period of time.

21. The method of claim 15, wherein the performance credit is based on a smoothed rate of return of the reserve fund for a particular period of time that includes a first amortized portion from the particular period and a second unamortized portion from a preceding period of time.

22. The method of claim 15, wherein the insured event is the death of the insured customer and the benefit amount is a death benefit payable to at least one beneficiary upon the death of the insured customer.

23. The method of claim 16, wherein the funds in the accumulation account are payable to at least one beneficiary upon the death of the insured customer.

24. The method of claim 15, wherein the determining if each applicant is insurable includes underwriting at least one of the personal, medical and financial information for that applicant.

25. The method of claim 15, wherein the insurance cost includes a number of payments to be made by the insured customer during particular periods of time.

26. The method of claim 25, further comprising causing the policy to lapse in the event that at least one of the number of payments is not received for at least one of the particular periods of time.

27. The method of claim 15, further comprising defining an additional payment amount to be received for at least one of the insured customers to provide additional life insurance for the at least one of the insured customers.

28. The method of claim 15, wherein the performance credit amount for each insured customer is calculated on an annual basis.

29. A physical computer readable medium including computer executable instructions which, when executed on a computing device, cause the computing device to:
  a) receive at least one application, each application associated with an applicant and including personal, medical and financial information about the applicant;
  b) for each application, determine if the applicant qualifies as an insured customer based on the personal, medical and financial information;
  c) define an account record associated with each insured customer, each account record having:
    i. at least one insured event associated with that insured customer;
    ii. a benefit amount payable in association with the at least one insured event;
    iii. an insurance cost to be received from that insured customer; and
    iv. a cash value based on predetermined account record factors;
  d) define a reserve fund based on a sum of the benefit amounts for each of the insured customers;
  e) determine an investment performance associated with the reserve fund during at least one period of time; and
  f) calculate a performance credit amount for each insured customer based on the investment performance of the reserve fund and the cash value in the account record for that insured customer.

* * * * *

UNITED STATES PATENT AND TRADEMARK OFFICE
CERTIFICATE OF CORRECTION

| | | |
|---|---|---|
| PATENT NO. | : 8,027,852 B2 | Page 1 of 1 |
| APPLICATION NO. | : 12/184391 | |
| DATED | : September 27, 2011 | |
| INVENTOR(S) | : Christopher Joseph Fievoli et al. | |

It is certified that error appears in the above-identified patent and that said Letters Patent is hereby corrected as shown below:

In the claims:

At Column 14, Claim 15, line 4 delete "$_{determining}$" and insert --determining, using a computer processor,--.

At Column 15, Claim 29, line 12 delete "A physical" and insert --A physical non-transitory--.

Signed and Sealed this
Twenty-seventh Day of December, 2011

David J. Kappos
*Director of the United States Patent and Trademark Office*